United States Patent Office 3,413,340
Patented Nov. 26, 1968

1

3,413,340
N-(CARBOXYMETHYL)-3-ALKOXY-POLY-
IODOANILIDE COMPOUNDS
Vernon H. Wallingford, Ferguson, Mo., assignor to Mallinckrodt Chemical Works, St. Louis, Mo., a corporation of Missouri
No Drawing. Continuation-in-part of application Ser. No. 242,083, Dec. 4, 1962. This application Sept. 19, 1966, Ser. No. 580,179
11 Claims. (Cl. 260—519)

This application is a continuation-in-part of my copending application Ser. No. 242,083, filed Dec. 4, 1962, now abandoned.

This invention relates to halogenated derivatives of meta-aminophenol, and more particularly to certain novel iodinated anilide derivatives.

Briefly, the invention is directed to certain 3-alkoxy-N-carboxyalkylpolyiodoanilides (also known as N-(3-alkoxy-polyiodophenyl)-N-acyl-aminoalkanoic acids) and to certain salts thereof. The invention also includes certain novel intermediates used in preparing the aforementioned compounds as well as methods of preparing the novel compounds of the class described.

Among the objects of the invention may be mentioned the provision of new halogenated compounds; the provision of new iodinated N-phenyl-N-acyl-amino acids; the provision of new 3-alkoxy-N-carboxyalkylpolyiodoanilides; the provision of compounds of the type indicated which are useful as roentgenographic contast agents; the provision of novel chemical intermediates for preparing compounds of the type indicated; and the provision of methods of preparing the novel compounds of the class mentioned. Other objects and features will be in part apparent and in part pointed out hereinafter.

The invention accordingly comprises the products hereinafter described, the scope of the invention being indicated in the following claims.

The present invention is directed to the novel compounds represented by the formula:

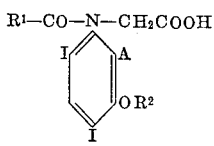

where $R^1$ and $R^2$ are selected from the group consisting of monovalent aliphatic hydrocarbon radicals and A is selected from the group consisting of hydrogen and iodine, and to lower alkyl esters thereof and salts thereof with pharmaceutically acceptable cations. The total number of carbon atoms in the $R^1$ and $R^2$ radicals should preferably be 4 or 5.

The novel 3-alkoxy-N-carboxyalkylpolyiodoanilides of the present invention are useful as roentgenographic contrast agents, especially in oral cholecystography. For this purpose they are ordinarily used either in the form of the free acid or as a salt thereof with a pharmaceutically acceptable cation such as sodium, calcium, N-methylglucamine or diethanolamine. These compounds are retively non-toxic and are well-tolerated by the animal organism at doses sufficient to visualize the gallbladder.

The compounds of the present invention may be prepared from meta-aminophenol by the series of steps illustrated in the following equations.

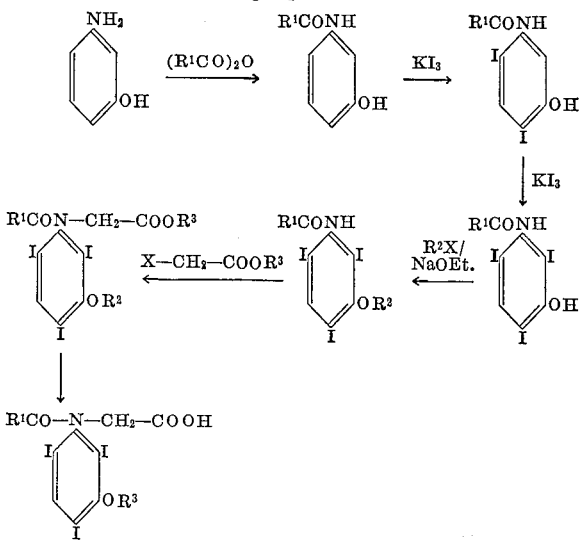

Here $R^1$ and $R^2$ have the meanings defined above, $R^3$ is a lower alkyl group and X is a halogen.

The iodination of the 3-hydroxyanilides with $KI_3$ in slightly alkaline solution proceeds fairly readily to the diiodo stage. Introduction of the third iodine is then best accomplished by separating the diiodo anilide compound from the accumulated by-products in the reaction mixture, redissolving it and treating the new solution with additional iodinating agent. Obviously, if triiodination is not desired the second iodination step may be omitted.

As an alternative, the meta-aminophenol may be iodinated before the amino group is acylated.

This alternate route for the preparation of the 3-hydroxy-2,4,6-triiodoanilides is indicated schematically as follows:

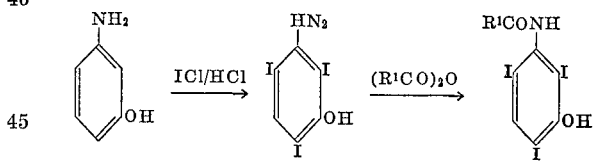

The alkylation of the amide is carried out under conditions similar to those disclosed in my U.S. Patent No. 3,048,626.

The following examples illustrate the invention.

Example 1.—3-acetamido-2,4,6-triiodophenol m-Aminophenol (43.6 g., 0.4 mole) was mixed with acetic acid (40 ml.), acetic anhydride (40 ml.) and zinc dust (.0 g.) and the mixture was stirred and heated to 100° C. for 15 minutes, then diluted to 800 ml. with hot water. The resulting solution of 3-acetamidophenol was treated with decolorizing carbon and filtered.

The solution of 3-acetamidophenol was diluted to 2400 ml. with water and made slightly alkaline (pH about 8.5) with 50% sodium hydroxide solution (about 55 ml.) Ice was added to lower the temperature to 25° C. and a solution of iodine (210.0 g.) and potassium iodide (210.0 g.) in 315 ml. of water was added during 30 minutes (203.0 g. iodine is the theoretical amount to introduce two iodines). During the addition, sodium hydroxide solution and ice were added to maintain the pH at about 8.5 and the temperature at 20–25° C. Toward the end, absorption of iodine became slower. After 30 minutes' stirring iodine was present, as determined with starch-iodide paper, and much solid remained undissolved. After acidification with acetic acid the product consisting largely of 3-acetamido-4,6-diiodophenol, was filtered off and washed with water (600 ml.)

A slurry of the wet cake (from the above filtration) in water (2400 ml.) was made slightly alkaline (pH 8.5) with sodium hydroxide and iodinated as above, using a solution of 105 g. of potassium iodide and 105 g. of iodine in 158 ml. of water. The solid gradually dissolved as the iodine solution was added. After an additional hour's stirring the crude product was precipitated by addition of acetic acid (40 ml.), bleached with sodium bisulfite, filtered and washed. After drying at 73° C. the resulting 3-acetamido-2,4,6-triiodophenol weighed 197.2 g. (93.8% of theory). It decomposed at about 204° C. Recrystallized from glacial acetic acid, it melted with decomposition at 212–214° C. Iodine: calculated for $C_8H_6I_3NO_2$, 72.0%; found, 71.7%.

Example 2.—3-acetamido-2,4,6-triiodophenol m-Aminophenol (10.9 g., 0.1 mole) was dissolved in hydrochloric acid (100 ml.) and the solution was stirred and chilled in an ice bath. A total of 51.0 g. of iodine monochloride (0.315 mole) in 51 ml. of hydrochloric acid was added in three equal portions at about 5 minute intervals. After the second addition, 150 ml. of water was added and after the third, 200 ml. of water. The mixture was stirred for about one hour, and the solid was filtered off and dissolved in 400 ml. of water with the aid of sodium hydroxide. The solution was bleached with 1 g. of sodium sulfite, and the product reprecipitated by the addition of hydrochloric acid. Final filtration and drying (preferably below about 60° C.) yielded crude 3-amino-2,4,6-triiodophenol in amounts between 40.5 g. and 48.8 g. in several runs. The crude material without further purification was satisfactory for subsequent syntheses.

Crude 3-amino-2,4,6-triiodophenol (16.0 g.) was added in portions with stirring to 25 ml. of acetic anhydride containing 10 drops of concentrated sulfuric acid and maintained at 60–65° C. After 10 minutes the solution was poured into 15% sodium hydroxide solution (200 ml.). The solid which precipitated was filtered off and resuspended in water. The slurry was made strongly alkaline with ammonium hydroxide and digested on a steam bath for about 45 minutes. Sodium hydroxide was added to complete the solution and the crude product was reprecipitated by the addition of hydrochloric acid. The crude product (about 90% yield) was dissolved in hot ethanol and the solution was treated with decolorizing carbon and filtered. The heated filtrate was diluted with about three-fourths its volume of water. The precipitation mixture of 3-acetamido-2,4,6-triiodophenol was cooled and the product was recovered by filtration and dried. M.P. 204.0–205.5° C. Calculated for $C_8H_6I_3NO_2$: neutral equivalent, 529; iodine 72.0%. Found: neutral equivalent, 522; iodine 70.1%.

Example 3.—2,4,6-triiodo-3-methoxyacetanilide 3-acetamido-2,4,6-triiodophenol (52.9 g., 0.1 mole) was dissolved in a solution of sodium ethylate, prepared by dissolving sodium (2.3 g., 0.1 mole) in anhydrous ethanol (80 ml.). After the addition of methyl iodide (18 g., 0.127 mole), the mixture was stirred at refluxing temperature for 1¾ hour, during which time a solid precipitated. The mixture was diluted with water (350 ml.), made strongly alkaline with ammonium hydroxide, and the product, 2,4,6-triiodo-3-methoxyacetanilide, was filtered off, washed and dried at 75° C. It weighed 50.7 g. A portion decomposed at 245.6° C. with evolution of iodine fumes.

Example 4.—N-(carboxymethyl)-2,4,6-triiodo-3-methoxyacetanilide 2,4,6-triiodo-3-methoxyacetanilide (54.3 g., 0.1 mole) was dissolved in a solution of sodium ethylate prepared from 2.3 g. (0.1 mole) of sodium and 80 ml. of anydrous ethanol. Ethyl bromoacetate (18.5 g., 0.11 mole) in 25 ml. of ethanol was added and the mixture was stirred at refluxing temperature for one-half-hour, at the end of which it was neutral to test paper. Sodium hydroxide 50% (11 ml.) was added to the cooled (50° C.), mixture, and the temperature was maintained at about 60° C. for 5 minutes. The solution was neutralized with acetic acid (5.5 ml.) and most of the alcohol was evaporated off on a steam bath. The solution was diluted to a volume of 600 ml. with water and filtered, the product was precipitated by the addition of an excess of hydrochloric acid, and the mixture digested hot until the product was crystalline. The mixture was cooled and the crystalline N-(carboxymethyl)-2,4,6-triiodo-3 - methoxyacetanilide filtered off, washed and dried at 110° C. Yield, 51.5 g., melting with decomposition at 185.0–187.0° C. The product was recrystallized from acetic acid but the material so treated had a low neutral equivalent, probably due to occluded acetic acid. Reprecipitation from an alkaline solution produced a pure product M.P., 190.3–191.4° C. (clear, colorless melt). Calculated for $C_{11}H_{10}I_3NO_4$: neutral equivalent, 601; iodine, 63.4%. Found: neutral equivalent, 605; iodine 63.6%. Infrared analysis confirmed the indicated structure.

Example 5.—2,4,6-triiodo-3-propoxyacetanilide 3-acetamido-2,4,6-triiodophenol (105.8 g., 0.2 mole) was dissolved in a solution of sodium ethylate prepared by dissolving sodium (4.6 g., 0.2 mole) in anhydrous ethanol (160 ml.). Propyl iodide (43 g., 0.25 mole) was added and the mixture was stirred and heated at reflux temperature for 3 hours, at the end of which it was neutral to test paper. When the side of the flask was scraped the solution deposited crystals and set to a firm mass. It was diluted to 950 ml. with hot water and made strongly alkaline with ammonium hydroxide. The 2,4,6-triiodo-3-propoxyacetanilide was filtered off, washed and dried at 75° C. Yield, 98.9 g. It melted to a dark liquid at 215.3° C.

Example 6.—N-(carboxymethyl)-2,4,6-triiodo-3-propoxyacetanilide 2,4,6-triiodo-3-propoxyacetanilide (97.4 g., 0.17 mole) was dissolved in a solution of sodium ethylate prepared by dissolving sodium (3.9 g., 0.17 mole) in anhydrous ethanol (160 ml.). Ethyl bromoacetate (36 g.) was added and the mixture was heated to refluxing and stirred for 30 minutes, at the end of which it was neutral. The mixture was cooled to 7° C., and 50% sodium hydroxide (20 ml.) was added, which caused the temperature to rise to 65° C. After 6 minutes at about 60° C., acetic acid (8 ml.) was added to make the mixture neutral. Most of the alcohol was evaporated on a steam bath using an air blast to speed evaporation. The mixture was diluted to 1600 ml. with water and made alkaline with ammonium hydroxide, and 10.9 g. of starting material was filtered off. The product, N-(carboxymethyl)-2,4,6-triiodo-3-propoxyacetanilide was precipitated by adding an excess of hydrochloric acid, digested on the steam bath to make it crystalline, filtered, washed and dried at 110° C. Weight 93.9 g., M.P. 192.2–193.2° C. Crystallization from acetic acid or reprecipitation from alkaline solution yielded a product with slightly low neutral equivalent. It was obtained pure by dissolving it in hot dimethyl formamide (250 ml.) and diluting the solution with water (600 ml.). Yield, 66.9 g., melting at 197.7–198.5° C. Calculated for $C_{13}H_{14}I_3NO_4$: neutral equivalent, 629;

iodine, 60%. Found: neutral equivalent, 624; iodine, 60.6%. Infrared analysis confirmed the indicated structure.

Example 7.—3-butoxy-2,4,6-triiodoacetanilide 3-acetamido-2,4-6-triiodophenol (105.8 g., 0.2 mole) was added to a cool (22° C.) solution of sodium ethylate, prepared by dissolving sodium (4.6 g., 0.2 mole) in anhydrous ethanol (160 ml.) and the mixture was stirred 10 minutes to completely dissolve the solid. n-Butyl iodide (45 g., 0.245 mole) was added and the mixture was stirred at refluxing temperature. After 1½ hour a solid had precipitated, necessitating the addition of 50 ml. of alcohol to make the mixture stirrable. After 4 hours the mixture was neutral, indicating completion of the reaction. It was diluted to 950 ml. with water, made strongly alkaline with ammonium hydroxide, and the product, 3-butoxy-2,4,6-triiodoacetanilide, was filtered off, washed and dried to constant weight at 110° C. Weight 106.9 g. (91.5%), melting with decomposition at 202.6–203.1° C.

Example 8.—3-butoxy-N-(carboxymethyl)-2,4,6-triiodoacetanilide 3-butoxy-2,4,6-triiodoacetanilide (105.2 g., 0.18 mole) was dissolved in a solution of sodium ethylate prepared from 4.15 g. (0.18 mole) of sodium and 160 ml. of anhydrous ethanol. Ethyl bromoacetate (33 g., 0.197 mole) in 50 ml. of ethanol was added. A rapid reaction took place, and after refluxing for half an hour the mixture was neutral, indicating that the reaction was complete. The mixture was cooled to 47° C., and 20 ml. of 50% sodium hydroxide was added. The temperature rose to 65° C. spontaneously and was maintained near 60° C. for 6 minutes. Acetic acid (11.5 ml.) was then added to render the mixture slightly acid. After about half of the alcohol had been evaporated on the steam bath the mixture was diluted to 1600 ml. with water, made slightly alkaline with ammonium hydroxide and filtered, and the product precipitated by an excess of hydrochloric acid. After the mixture had been digested on the steam bath to render the product crystalline, the crude product was filtered off, washed, and dried at 110° C. Yield, 99.8 g., M.P. 189.1–192.1° C. It was purified by dissolving it in hot dimethylformamide and diluting the solution with twice the volume of water. After purification the M.P. of the 3-butoxy-N-carboxymethyl-2,4,6-triiodoacetanilide was 194.2–195.2° C. Calculated for $C_{14}H_{16}I_3NO_4$: neutral equivalent, 642.7; iodine 59.1%. Found: Neutral equivalent, 642.5; iodine, 59.05%. Infrared analysis confirmed the indicated structure.

Example 9.—3-allyloxy-2,4,6-triiodoacetanilide 3-acetamido-2,4,6-triiodophenol (105.8 g., 0.2 mole) was dissolved in a solution of sodium ethylate prepared by dissolving sodium (4.6 g., 0.2 mole) in anhydrous ethanol (210 ml.). After the addition of allyl chloride (25.0 g., 0.33 mole) the mixture was stirred at refluxing temperature 1½ hours, at the end of which it was neutral to test paper. The slurry of crystals was diluted to 950 ml. with water made strongly alkaline with ammonium hydroxide, filtered warm and washed. Dried at 110° C. the product, 3-allyloxy-2,4,6-triiodoacetanilide, weighed 87.1 g. and melted at 210.2° C. with decomposition. Some starting material (19.8 g.) was recovered by acidifying the mother liquor.

Example 10.—3-allyloxy-N-(carboxymethyl)-2,4,6-triiodoacetanilide 3-allyloxy-2,4,6-triiodoacetanilide (85.7 g., 0.15 mole) was dissolved in a solution of sodium ethylate prepared from 3.45 g. (0.15 mole) of sodium and 150 ml. of anhydrous ethanol. Ethyl bromoacetate (28 g.) in 50 ml. of ethanol was added and the mixture was stirred at refluxing temperature for one hour, at the end of which it became neutral to test paper. With the temperature reduced to 47° C., 50% sodium hydroxide (15 ml.) was added and the mixture was maintained at 55–60° C. for 10 minutes. The excess sodium hydroxide was neutralized with acetic acid and most of the alcohol was removed by evaporation on the steam bath. The residue was diluted to 900 ml. with warm water, adjusted to pH 8 with ammonium hydroxide and 11.5 g. of starting material was filtered off. The mother liquor was acidified to about pH 2 with hydrochloric acid, digested on the steam bath to render the precipitate crystalline and filtered to yield 80.5 g. of crude product, M.P. 200.5° C. with decomposition. The crude product was purified by dissolving it in about 1 liter of water with the aid of sodium hydroxide, and precipitating the sodium salt by the addition of 100 g. of sodium chloride. The gummy sodium salt was dissolved in water and the purified product was recovered by acidifying the solution with hydrochloric acid. The addition of ether hastened the crystallization of the product, 3-allyloxy-N-(carboxymethyl)-2,4,6-triiodoacetanilide, which was separated and dried at 110° C. Yield, 56 g., melting with decomposition at 202.3–203.7° C. Calculated for $C_{13}H_{12}I_3NO_4$: neutral equivalent, 626.7; iodine 60.7%. Found: neutral equivalent, 627; iodine, 60.4%. Infrared analysis confirmed the indicated structure.

Example 11.—3-butyramido-2,4,6-triiodophenol m-Aminophenol (54.5 g., 0.5 mole) was mixed with dimethylformamide (50 ml.) zinc dust (10.0 g.) and n-butyric anhydride (120 g.). The temperature rose to 95° C. spontaneously and the mixture was stirred and maintained at 95–105° C. for 15 minutes. It was then cooled to 65° C., water (100 ml.) was added, and after a few minutes the mixture was further diluted to 1 liter with water. Sodium hydroxide 50% (65 ml.) and ammonium hydroxide (25 ml.) were added to make it strongly alkaline. After 10 minutes at 65° C. the solution was treated with decolorizing carbon, filtered and acidified to pH 4 with hydrochloric acid. The product, 3-butyramidophenol, was filtered off, washed and dried at 70° C. Yield 77.8 g. (86.9%), M.P. 137.4–138.8° C.

3-butyramidophenol (71.6 g., 0.4 mole) was dissolved in water (2 liters) with the aid of 50% sodium hydroxide (11 ml.). Ice was added as needed to maintain the temperature at 20–25° C. During 30 minutes a solution of potassium iodide (210 g.), and iodine (210 g.) in 320 ml. of water was added in portions. Dilute sodium hydroxide (75 ml. of 50% sodium hydroxide to 450 ml. water) was added as needed to maintain the pH at 8.5–9.0. A heavy precipitate formed. More water was added toward the end to make the total volume about 3600 ml. After 45 minutes' stirring the partially iodinated product was precipitated by the addition of 40 ml. of acetic acid. The solid was filtered off, washed, and reslurried in water (2 liters). After the addition of sodium hydroxide (12 ml. of 50% solution), together with sufficient ice to reduce the temperature to 20–25° C., a second iodination was carried out precisely as above but using half as much iodine solution (105 g. potassium iodide, 105 g. iodine in 160 ml. water), added during 40 minutes. Diluted sodium hydroxide was added as before to maintain the pH at 8.5–9.0. The final volume was 3600 ml., pH 8.5–9.0 and all solids had dissolved to a clear red solution, giving a strong positive test for iodine with starch-iodide paper. To insure complete triiodination it is necessary to make sure that under these conditions the iodine color remains over a period of ½ to ¾ hour. In various runs sometimes slightly less and sometimes slightly more (15–20 ml.) iodine solution was required. The excess iodine was then reduced with sodium bisulfite solution, and the product, 3-butyramido-2,4,6-triiodophenol was precipitated by addition of acetic acid, filtered off, washed, and dried at 70° C. Yield 218.6 g. (97%), M.P. 182–182.9° C.

Example 12.—3-butyramido-2,4,6-triiodophenol

Crude 3-amino-2,4,6-triiodophenol (100 g., 0.205 mole) was added to a stirred solution of concentrated sulfuric acid (8 ml.) in n-butyric anhydride (250 ml.) at 60° C. This solution was stirred 15 minutes at 60–70° C. and poured into 5 N sodium hydroxide (2 liters). A gummy residue was stirred with ammonium hydroxide (500 ml.), and the small amount of remaining undissolved material was filtered off and dissolved by warming it on the steam bath with 5 N sodium hydroxide (2 liters) and ammonium hydroxide (500 ml.). The combined solutions were cooled to 20° C. and acidified with acetic acid, after which concentrated hydrochloric acid was added. After 30 minutes stirring the crude product was filtered off and dried at 60° C. Yield, 93 g. (84%). The crude product was dissolved in ethanol, and the solution was treated with decolorizing carbon and filtered, after which water was added to induce crystallization. The purified 3-butyramido-2,4,6-triiodophenol was filtered off and dried, M.P. 181–183° C. (with decomposition).

Example 13.—3-butoxy-2,4,6-triiodobutyranilide 3-butyramido-2,4,6-triiodophenol (111.3 g., 0.2 mole) was dissolved in a solution of sodium ethylate prepared from 4.6 g. (0.2 mole) of sodium and 160 ml. of anhydrous ethanol. n-butyl iodide (45 g., 0.25 mole) was added and the mixture was stirred and heated to reflux until neutral (2¼ hours). The solution was treated with decolorizing carbon and filtered hot. When the solution cooled, the product crystallized and was filtered off, washed with alcohol and slurried with 800 ml. of hot water and the slurry was made alkaline with sodium hydroxide. After filtering, washing and drying at 75° C., this first crop weighed 80.1 g. A second crop of 27.5 g. was obtained by concentrating the liquors to 50 ml. and diluting with 600 ml. of water made alkaline with sodium hydroxide. Total yield of 3-butoxy-2,4,6-triiodobutyranilide, 107.6 g. (87.8%), M.P. 160.4–163.4° C.

Example 14.—3-butoxy-N-(carboxymethyl)-2,4,6-triiodobutyranilide 3-butoxy-2,4,6-triiodobutyranilide (98.1 g., 0.16 mole) was dissolved with stirring and gentle warming in a solution of sodium ethylate prepared from 3.68 g. (0.15 mole) of sodium and 150 ml. of anhydrous ethanol. Ethyl bromoacetate (32.0 g., 0.192 mole) was added and the mixture was maintained at about 65° C. for 10 minutes, at the end of which the reaction was evidently complete (neutral to test paper). Sodium hydroxide (15 ml. of 50% solution) was then added and the temperature kept at 65–70° C. for 12 minutes. The mixture was then made slightly acid with acetic acid (6 ml.), and most of the alcohol was evaporated off on the steam bath. The partly solidified residue was diluted to 1500 ml., made slightly alkaline with sodium hydroxide, and filtered to obtain 18.3 g. of starting material. The crude product was obtained by acidifying the liquor with hydrochloric acid. This gummy material was rendered crystalline by digestion on the steam bath. After filtering, washing, and drying at 110° C. the crude product weighed 85.7 g.

The crude product was purified by dissolving it in 600 ml. of water, using sodium hydroxide, and precipitating the sodium salt by the addition of 30 g. of sodium chloride. The sodium salt became crystalline on standing 3 days. It was separated from the liquor and dissolved in 800 ml. of water at about 50° C. The free acid was precipitated by adding the solution slowly (20 minutes) to 400 ml. of water containing 25 ml. of acetic acid. The pure 3-butoxy-N-carboxymethyl-2,4,6-triiodobutyranilide dried at 110° C., weighed 60.9 g. Calculated for $C_{16}H_{20}I_3NO_4$ neutral equivalent, 670.7; iodine, 56.8%. Found: neutral equivalent, 663; iodine, 56.0%. Infrared analysis confirmed the indicated structure.

Example 15.—3-allyloxy-2,4,6-triiodobutyranilide 3-butyramido-2,4,6-triiodophenol (111.3 g., 0.2 mole) was added to a solution of sodium ethylate prepared from 4.7 g. (0.204 mole) of sodium and 260 ml. of anhydrous ethanol. Allyl chloride (3.2 g., 0.42 mole) was added, and the mixture was stirred and heated to refluxing temperature for 3 hours, diluted to 1500 ml. with water, and made alkaline (pH 9.0) with sodium hydroxide. The undissolved 3-allyloxy-2,4,6-triiodobutyranilide was filtered off, washed, and dried at 70° C. Yield 117.1 g. (98.3%), M.P. 183.4–184.9° C.

Example 16.—3-allyloxy-N-(carboxymethyl)-2,4,6-triiodobutyranilide 3-allyloxy-2,4,6-triiodobutyranilide (113.3 g., 0.2 mole) was dissolved in a solution of sodium ethylate, prepared from 4.6 g. (0.2 mole) of sodium and 70 ml. anhydrous ethanol, and dimethylformamide (150 ml.) was added. The flask was provided with a magnetic stirrer, suspended over a hot plate and connected through a dry ice trap to an oil pump. After substantially all of the alcohol was evaporated ethyl bromoacetate (36 g.) was added, causing the temperature to rise spontaneously from 20° to 65° C. The mixture was maintained at 60°–65° C. for 20 minutes, at the end of which it was neutral to test paper. Dilution with 1500 ml. of water precipitated a gummy mass which was dissolved in 200 ml. of alcohol at 60° C. Sodium hydroxide (25 ml. of 50% solution) was added in portions and the mixture was maintained at 55°–65° C. for 15 minutes. The excess sodium hydroxide was neutralized by adding acetic acid (17.5 ml.) and about half of the alcohol was evaporated on a steam bath. Dilution to 1800 cc. with water at 55° C. produced a clear, somewhat dark solution, showing that all ester had been hydrolyzed. The crude product precipitated from the solution as an amorphous mass by hydrochloric acid was dissolved in 150 ml. of ethanol, treated with decolorizing carbon, filtered, and crystallized by adding 175 ml. of water. Filtered off, washed with 50% alcohol and dried at 110° C., the product weighed 118.3 g. and melted at 156.6–159.4° C. It was dissolved in 400 ml. of water with the aid of N-methylglucamine, extracted twice with 250 ml. of ether and precipitated by the addition of hydrochloric acid. It was then obtained in nicely crystalline form by dissolving it in alcohol (170 ml.), treating the solution with decolorizing carbon, and precipitating the product by adding 250 ml. of water. Dried at 110° C., the 3-allyloxy-N-(carboxymethyl)-2,4,6-triiodobutyranilide weighed 90 g. and melted at 160.5°–161.8° C. Calculated for $C_{15}H_{16}I_3NO_4$: neutral equivalent, 654.7; iodine, 58.1%. Found: neutral equivalent, 652.5; iodine, 57.8%. Infrared analysis confirmed the indicated structure.

Example 17.—2,4,6-triiodo-3-methoxybutyranilide 3-butyramido-2,4,6-triiodophenol (111.3 g., 0.2 mole) was added to a solution of sodium ethylate prepared from 4.7 g. (0.204 mole) of sodium and 160 ml. of anhydrous ethanol. Methyl iodide (40.0 g., 0.281 mole) was added and the mixture was stirred and heated to refluxing temperature for ¾ hour, at which time it set to a mass of crystals. Ethanol (100 ml.) was added to make the mixture stirrable, and heating was continued a further half hour, at which time the mixture was neutral to test paper. The mixture was diluted to 1500 ml. with water, made alkaline (pH 9.0) with sodium hydroxide and filtered. The 2,4,6-triiodo-3-methoxybutyranilide was washed and dried at 70° C. Yield, 109.0 g. (95.7%). It melts to a dark liquid at 193.4°–194.7° C.

Example 18.—N-(carboxymethyl)-2,4,6-triiodo-3-methoxybutyranilide 2,4,6-triiodo-3-methoxybutyranilide (108.2 g., 0.2 mole) was dissolved in a solution of sodium ethylate prepared from 4.6 g. of sodium (0.2 mole) and 160 ml. of anhydrous ethanol and to this solution was added ethyl bromoacetate (36.0 g., 0.215 mole). A rapid reaction took place, causing the temperature to rise from 35° C. to 55° C. in five minutes. At the end of 20 minutes the reaction was complete (neutral to test paper). The mixture was cooled to 25° C., and sodium hydroxide 50% (25 ml.) was added, the temperature rising to 55° C. The temperature was kept at 55–60° C. for 20 minutes and the mixture was diluted to 1200 ml. with water, a clear but slightly dark solution resulting. Hydrochloric acid was added to precipitate a dark gummy mass, which was separated from the liquor by decantation and redissolved in 1600 ml. of water with the aid of ammonium hydroxide. Some undissolved starting material (17.8 g.) was filtered off and the liquor was treated with decolorizing carbon and filtered. The crude product was precipitated by addition of an excess of hydrochloric acid, and it became crystalline on standing three days in the liquor. It was then separated and dried at 70° C. Weight, 80.8 g. Recrystallized from benzene, using decolorizing carbon, the product, N-(carboxymethyl)-2,4,6-triiodo - 3 - methoxybutyranilide, melted at 127.2–128.0° C. The initially glistening crystals from the benzene lost their lustre during drying, indicating that they had been solvated. During drying the temperature was raised gradually to 110° C. to avoid sintering. Calculated for $C_{13}H_{14}I_3NO_4$: neutral equivalent, 628.7, iodine, 60.0%. Found: neutral equivalent, 628.0; iodine, 60.5%.

Example 19.—2,4,6-triiodo-3-propionamidophenol m-Aminophenol (54.5 g., 0.5 mole), dimethylformamide (50 ml.), powdered zinc (10 g.) and propionic anhydride (99 g.) were mixed and stirred. The temperature rose due to heat of reaction and was maintained at 95–100° C. for 15 minutes. After the cautious addition of 100 ml. of water, 50% sodium hydroxide (65 ml.) and ammonium hydroxide (25 ml.) were added, the temperature being maintained at 60–65° C. for 15 minutes. After dilution to 1 liter, the solution was treated with decolorizing carbon, and filtered. Hydrochloric acid was added to precipitate the 3-propionamidophennol, the mixture was cooled, and the product filtered off, washed, and dried at 70° C. Yield, 75.7 g. (91.7%), M.P. 180.4–181.9° C.

3-propionamidophenol (66.0 g., 0.4 mole) was dissolved in 2 liters of water by adding sodium hydroxide 50% (11 ml.). Ice was added as needed to maintain the temperature at 20–23° C. During 15 minutes a solution containing potassium iodide (210 g.) and iodine (210 g.) in 320 ml. of water was added in portions. Dilute sodium hydroxide solution (75 ml. of 50% sodium hydroxide to 450 ml. of water) was added as needed to maintain the pH at 8.5–9.0. After ¾ hour's stirring no iodine remained in the mixture (as indicated by starch-iodide paper). The partially iodinated product was precipitated by addition of acetic acid, filtered off, washed, and reslurried in 2 liters of water plus 12 ml. of 50% sodium hydroxide. Iodination was repeated as above except that half as much iodine solution was used (105.0 g. of potassium iodide, 105.0 g. iodine and 160 ml. of water). The addition required 40 minutes, during which time all solid went into solution. After a further ¾ hour's stirring the excess iodine was reduced by sodium bisulfite solution and the product was precipitated with excess acetic acid. After filtration, washing, and drying at 110° C., the 2,4,6-triiodo - 3 - propionamidophenol weighed 199.5 g. (92% yield). It melted with decomposition at 203.7° C.

Example 20.—2,4,6-triiodo-3-propionamidophenol

Crude 3-amino-2,4,6-triiodophenol (100 g., 0.205 mole) was added to a stirred solution of concentrated sulfuric acid (8 ml.) in propionic anhydride (250 ml.) at 60° C. The solution was stirred for 15 minutes at 60–70° C. and was then poured into 5 N sodium hydroxide (2 liters). Ammonium hydroxide (500 ml.) was added to the resulting suspension, and the mixture was warmed on a steam bath for 30 minutes. The undissolved material was filtered off and dissolved separately in 5 N sodium hydroxide (2 liters) and ammonium hydroxide (500 ml.) by heating the mixture for 1 hour on the steam bath. The combined solutions were cooled to 20° C. and acidified with acetic acid, after which concentrated hydrochloric acid was added. After 30 minutes' stirring the product was filtered off, washed and dried at 60° C. Weight 93 g. (84% yield). The crude product was dissolved in ethanol, and the solution was treated with decolorizing carbon and filtered, after which water was added to induce crystallization. The purified 2,4,6-triiodo-3-propionamidophenol was filtered off and dried. M.P. 201.4–202.2° C. (with decomposition).

Example 21.—3-allyloxy-2,4,6-triiodopropionanilide 2,4,6-triiodo - 3 - propionamidophenol (108.5 g., 0.2 mole) was dissolved in a solution of sodium ethylate, prepared from 4.7 g. (0.204 mole) of sodium and 160 ml. of anhydrous ethanol. Allyl chloride (32 g., 0.42 mole) was added and the mixture was stirred and heated at refluxing temperature for 5 hours. A copious precipitate formed, and during the early stages of heating, a total of 200 ml. of anhydrous ethanol was added to make the mixture stirrable. The product was recovered by diluting the mixture to 1 liter with water, making it alkaline (pH 8.5) with sodium hydroxide and filtering. The 3-allyloxy-2,4,6-triiodopropionanilide was dried at 110° C. Yield, 113.6 g. (97.5%). It melts to a dark liquid at 201.8°–202.8° C.

Example 22.—3-allyloxy-N-(carboxymethyl)-2,4,6-triiodopropionanilide 3-allyloxy-2,4,6-triiodopropionanilide (110.0 g., 0.19 mole) was dissolved in a solution of sodium ethylate prepared from 4.6 g. (0.2 mole) of sodium and 160 ml. of anhydrous ethanol. The solution was cooled in an ice bath, and ethyl bromoacetate (36.0 g.) was added in portions, after which the mixture was warmed to 55° C. for 15 minutes. A solid separated and 50 ml. of ethanol was added to make the mixture stirrable. Reaction was complete as evidenced by a neutral reaction to test paper. Sodium hydroxide (25 ml. of 50% solution) was added in portions, the temperature being kept at 55°–60° C. After 15 minutes 1600 ml. of water was added. Acetic acid was added (to pH 7.5) and 16.3 g. of insoluble material was filtered off. The crude product was obtained by acidifying the liquor with excess hydrochloric acid, filtering, and drying the solid at 110° C. Yield, 98.7 g., melting at 202.2°–202.7° C. The crude product was dissolved in 800 ml. of water, with the aid of N-methylglucamine (pH 8.5) and extracted with two 350 ml. portions of ether, about 2 g. of sodium chloride being added to hasten separation of the layers. The precipitate obtained by acidifying the aqueous liquor was dissolved in ethanol (450 ml.) as the sodium salt (pH 8). The alcoholic solution was filtered and the product was obtained pure by diluting the solution to 1400 ml. with hot water, acidifying it to pH 2 with hydrochloric acid and recovering the precipitated crystals in the usual manner. After drying at 70° C. the product, 3-allyloxy-N-carboxymethyl - 2,4,6 - triiodopropionanilide, weighed 85.8 g. It darkened at 195° C. and decomposed at 208.2°–208.7° C. Calculated for

$$C_{14}H_{14}I_3NO_4$$

neutral equivalent, 640.7; iodine, 59.4%. Found, neutral equivalent, 638; iodine, 60.1%. Examination by infrared spectroscopy confirmed the indicated structure.

Example 23.—2,4,6-triiodo-3-isopropoxyacetanilide 3-acetamido-2,4,6-triiodophenol (52.9 g., 0.1 mole mole) was dissolved in a solution of sodium ethylate prepared from 2.3 g. (0.1 mole) of sodium and 80 ml. of anhydrous ethanol, and isopropyl bromide (25.0 g., 0.2 mole) was added. After 20 hours refluxing, ethanol (50 ml.) and decolorizing carbon were added and the mixture was filtered. Most of the alcohol was evaporated and the residue was diluted with 800 ml. of hot water, made alkaline (pH 8.5–9.0) with sodium hydroxide and digested on the steam bath to render the precipitate crystalline. After filtration and drying at 110° C. the crude 2,4,6-triiodo-3-isopropoxyacetanilide weighed 52.8 g. (92.7% yield). A sample crystallized from 50% ethanol melted at 170.0°–171.9° C. Its structure was confirmed by infrared analysis.

Example 24.—N-(carboxymethyl)-2,4,6-triiodo-3-isopropoxyacetanilide 2,4,6-triiodo - 3 - isopropoxyacetanilide (28.6 g., 0.05 mole) was dissolved in a solution of sodium ethylate prepared from 1.2 g. (0.052 mole) of sodium and 40 ml. of anhydrous ethanol. Ethyl bromoacetate (10 g., 0.06 mole) was added. A rapid reaction took place and was completed by heating the mixture to 60° C. for 20 minutes. Sodium hydroxide 50% (8 ml.) was added and the mixture set solid, requiring the addition of 50 ml. of ethanol to render it stirrable. After 10 minutes at about 60° C., 250 ml. of water was added, producing a dark colored but clear solution. The pH was adjusted to 7 with acetic acid and most of the alcohol was removed by evaporation on the steam bath. The crude product was recovered by acidifying the solution with hydrochloric acid to pH 3 and digesting at 90°–95° C. to render the solid material crystalline. Fltered off and dried at 70° C., it weighed 30.9 g. The crude product was dissolved in 300 ml. of water, with the aid of 9.0 g. of N-methylglucamine, filtered, extracted twice with 250 ml. of ether, and precipitated by adding it in small portions to 100 ml. of hot water containing 8 ml. of hydrochloric acid. It crystallized in hard pellets. Dried at 110° C., the N-(carboxymethyl)-2,4,6-triiodo - 3 - isopropoxyacetanilide weighed 28.2 g., M.P. 177.1°–180.1° C. Calculated for $C_{13}H_{14}I_3NO_4$ neutral equivalent, 628.7; iodine, 60.5%. Found: neutral equivalent, 631; iodine, 60.1%. Infrared analysis confimed the indicated structure.

Example 25.—5-acetamido-2,4-diiodophenol m-Aminophenol (43.6 g., 0.4 mole), acetic acid (40 ml.) and acetic anhydride (60 ml.) were mixed and maintained at about 100° C. for 15 minutes. The mixture was diluted to 2 liters with water, made alkaline with sodium hydroxide (78 ml. of 50% solution) and cooled to 20° C. A solution of potassium iodide (210 g.), and iodine (210 g.) in 320 ml. of water was added in portions over a period of ¾ hour. Sodium hydroxide solution (1 vol. of 50% solution to 5 vol. of water) and ice were added as needed to maintain the pH at 8.5–9.0 and the temperature at 20°–23° C. Water was added to make the volume 3600 ml. At the end of this period, there was considerable undissolved matter and the mixture was reddish due to excess iodine. After 30 minutes stirring practically all iodine had disappeared as shown by a test with starch-iodide paper, and the remaining trace was reduced with sodium bisulfite solution. All of the solid was dissolved by the addition of 50% sodium hydroxide (30 ml.); then most of the 5-acetamido-2,4-diiodophenol was precipitated as the sodium salt by the addition of 200 g. of sodium chloride. The crystalline sodium salt was filtered off and washed with 5% sodium chloride solution. The mother liquor was acidified with hydrochloric acid, and the precipitated solid, recovered by filtration, was dissolved in a volume of 1 liter by means of sodium hydroxide and warming to 50° C. Sodium chloride (100 g.) was added to obtain a further quantity of the sodium salt of the diodo compound. The combined crops of sodium salt thus obtained were dissolved in 1500 ml. of hot water, treated with decolorizing carbon, filtered and precipitated by addition of excess acetic acid. Filtered off, washed and dried at 70° C., the 5-acetamido - 2,4 - diiodophenol weighed 82.0 g., M.P. 245.2–246.7° C. with decomposition. Iodine: Calculated for $C_8H_7I_2NO_2$: 63.0%; found, 62.9%. Infrared analysis confirmed the indicated structure.

Example 26.—5-allyloxy-2,4-diiodoacetanilide 5-acetamido-2,4-diiodophenol (40.3 g., 0.1 mole) was dissolved in a solution of sodium ethylate prepared from 2.3 g. (0.1 mole) of sodium and 105 ml. of anhydrous ethanol. Allyl chloride (20 g., 0.26 mole) was added and the mixture was stirred at refluxing temperature until neutral (2 hours). Water was added to a volume of 800 ml. and the pH was adjusted to 8.5–9.0 with sodium hydroxide. The crystalline product 5-allyloxy-2,4-diiodoacetanilide, obtained by filtration and drying at 110° C., weighed 43.1 g. (97.2% yield), M.P. 204.2°–205.8° C. The indicated structure was confirmed by infrared examination.

Example 27.—5-allyloxy-N-(carboxymethyl)-2,4-diiodoacetanilide 5-allyloxy-2,4-diiodoacetanilide (41.5 g., 0.091 mole) was dissolved in a solution of sodium ethylate prepared from 2.2 g. (0.096 mole) of sodium and 30 ml. of anhydrous ethanol. Dimethylformamide (50 ml.) was added, and practically all of the alcohol was distilled out by means of an oil pump connected to the flask through a dry ice trap. The residual syrupy mixture was cooled in an ice bath, and ethyl bromoacetate (20 g.) was added in portions. A rapid reaction took place as evidenced by a rise in temperature of several degrees. The mixture was stirred and warmed to 60° C., until completion of the reaction (neutral to test paper). With the temperature still at 60° C., sodium hydroxide solution (12 ml. of 50% solution diluted with 12 ml. of water) was added, the temperature rising rapidly to 75° C. After 10 minutes at 60°–70° C. the mixture was diluted with water to a volume of 800 ml., neutralized with acetic acid and a small quantity (0.8 g.) of starting material was filtered off. The filtrate was added in portions to 200 ml. of hot water (70°–80° C.) containing 15 ml. of hydrochloric acid, the first precipitate being allowed to become crystalline before the rest of the liquor was added. After filtration, washing and drying at 75° C. the product weighed 44.7 g. The crude 5-allyloxy-N-carboxymethyl-2,4-diiodoacetanilide was dissolved in 250 ml. of water with the aid of 17.5 g. of N-methylglucamine, and the solution was extracted twice with 250 ml. of ether, diluted to 800 ml. and precipitated by means of excess hydrochloric acid. Yield of pure 5-allyloxy-N-(carboxymethyl)-2,4-diiodoacetanilide, 41.6 g., M.P. 174.5°–175.5° C. Calculated for $C_{13}H_{13}I_2NO_4$: neutral equivalent, 500.8; iodine, 50.7%. Found: neutral equivalent, 503.5; iodine 50.2%. Infrared examination confirmed the indicated structure.

Acute intravenous toxicity determinations in mice were carried out, using aqueous solutions of the N-methylglucamine salts of the 3-alkoxy-N-craboxymethyl-polyiodoanilides disclosed in the preceding examples. Also, the relative effectiveness of these compounds as agents for visualizing the gallbladder was evaluated, using the cat as a test animal.

Each compound was administered orally to four or more cats in the form of a solution of the N-methylglucamine salt. The dosage was adjusted to a uniform level of 59.3 mg. of iodine per kg. of body weight. X-ray photographs of each cat were taken at regular intervals following administration of the test substances. From these, the Cholecystographic Index (degree of X-ray visualization of the gallbladder) was determined for each photographic exposure according to the scheme outlined in Table 1, and the Average Cholecystographic Index (ACI) (Hoppe and Archer, Am. J. Roentgenol., 69, 630; 1953) was calculated for each compound at each time interval.

TABLE 1.—SCHEME FOR GRADING CHOLECYSTOGRAMS

Cholecystograhic Index: Description
- 0 — No visualization.
- 1 — Indistinct visualization.
- 2 — Distinct visualization, low intensity.
- 3 — Sharp visualization, satisfactory intensity.
- 4 — Excellent visualization, intensity equivalent to that of bones of animal.

The results of the toxicity and visualization studies are presented in Table 2. In the visualization studies, no signs of toxicity were observed in any of the cats. In presenting the results of the visualization studies the maximum ACI achieved with each compound is reported.

TABLE 2

Compound

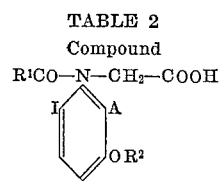

| Example | A | $R^1$ | $R^2$ | Acute I.V. $LD_{50}$ in mice. (mg. NMG salt/kg. body wt.) | Max. ACI |
|---|---|---|---|---|---|
| 4 | I | $CH_3-$ | $-CH_3$ | 675 | 2.8 |
| 6 | I | $CH_3-$ | $-CH_2CH_2CH_3$ | 490 | 3.3 |
| 24 | I | $CH_3-$ | $-CH(CH_3)_2$ | 716 | 3.3 |
| 10 | I | $CH_3-$ | $-CH_2CH=CH_2$ | 543 | 3.5 |
| 27 | I | $CH_3-$ | $-CH_2CH=CH_2$ | 372 | 3.5 |
| 8 | I | $CH_3-$ | $-(CH_2)_3CH_3$ | 537 | 2.8 |
| 22 | I | $CH_3CH_2-$ | $-CH_2CH=CH_2$ | 427 | 3.0 |
| 18 | I | $CH_3CH_2CH_2-$ | $-CH_3$ | 570 | 3.8 |
| 16 | I | $CH_3CH_2CH_2-$ | $-CH_2CH=CH_2$ | 427 | 2.5 |

In comparison with the visualization results set forth above, the compound N-carboxymethyl-2,4,6-triiodoacetanilide, disclosed in Wallingford United States Patent 3,048,626, had a maximum ACI of 1.8 after administration to cats as the N-methylglucamine salt at a dosage representing 59.3 mg. of iodine per kg. of body weight.

In view of the above, it will be seen that the several objects of the invention are achieved and other advantageous results obtained.

As various changes could be made in the above products without departing from the scope of the invention, it is intended that all matter contained in the above description shall be interpreted as illustrative and not in a limiting sense.

What is claimed is:

1. A compound selected from compounds of the general formula:

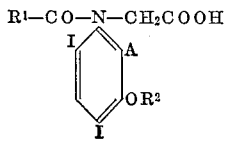

where $R^1$ and $R^2$ are selected from the group consisting of lower alkyl and allyl hydrocarbon radicals and A is selected from the group consisting of hydrogen and iodine, lower alkyl esters of such compounds and salts of such compounds with pharmaceutically acceptable cations.

2. 2,4,6-triiodo compound as defined in claim 1 wherein $R^1$ and $R^2$ are methyl groups.

3. A 2,4,6-triiodo compound as defined in claim 1, wherein $R^1$ is methyl and $R^2$ is n-propyl.

4. A 2,4,6-triiodo compound as defined in claim 1, wherein $R^1$ is methyl and $R^2$ is isopropyl.

5. A 2,4,6-triiodo compound as defined in claim 1, wherein $R^1$ is methyl and $R^2$ is allyl.

6. A compound as defined in claim 1, wherein $R^1$ is methyl, $R^2$ is allyl and A is hydrogen.

7. A 2,4,6-triiodo compound as defined in claim 1, wherein $R^1$ is methyl and $R^2$ is butyl.

8. A 2,4,6-triiodo compound as defined in claim 1, wherein $R^1$ is ethyl and $R^2$ is allyl.

9. A 2,4,6-triiodo compound as defined in claim 1, wherein $R^1$ is propyl and $R^2$ is methyl.

10. A 2,4,6-triiodo compound as defined in claim 1, wherein $R^1$ is propyl and $R^2$ is allyl.

11. A 2,4,6-triiodo compound as defined in claim 1, wherein $R^1$ is propyl and $R^2$ is butyl.

References Cited

UNITED STATES PATENTS 3,133,116  5/1964  Larsen _____ 260—519

LORRAINE A. WEINBERGER, *Primary Examiner.*

L. A. THAXTON, *Assistant Examiner.*